(12) United States Patent
Beebe et al.

(10) Patent No.: US 7,240,697 B2
(45) Date of Patent: Jul. 10, 2007

(54) APPARATUS AND METHOD FOR ISOLATING AND TESTING A SEGMENT OF PIPELINES

(75) Inventors: Wayne W. Beebe, Manitowoc, WI (US); Charles L. Stecker, Manitowoc, WI (US)

(73) Assignee: Mechanical Research & Design, Inc., Manitowoc, WI (US)

( * ) Notice: Subject to any disclaimer, the term of this patent is extended or adjusted under 35 U.S.C. 154(b) by 0 days.

(21) Appl. No.: 11/254,568

(22) Filed: Oct. 20, 2005

(65) Prior Publication Data

US 2006/0086400 A1   Apr. 27, 2006

Related U.S. Application Data

(60) Provisional application No. 60/621,264, filed on Oct. 21, 2004.

(51) Int. Cl.
*F16L 55/10* (2006.01)
(52) U.S. Cl. .............................. 138/89; 138/90; 138/97; 138/93; 73/49.8
(58) Field of Classification Search .................. 138/97, 138/93, 90, 89; 73/49.8, 49.5, 46
See application file for complete search history.

(56) References Cited

U.S. PATENT DOCUMENTS

| | | | | |
|---|---|---|---|---|
| 2,241,526 | A | * | 5/1941 | Rosenkranz .................. 138/90 |
| 3,103,235 | A | * | 9/1963 | Stringham, III .............. 138/97 |
| 3,269,421 | A | * | 8/1966 | Telford et al. ................ 138/97 |
| 3,618,639 | A | * | 11/1971 | Daley et al. .................. 138/97 |
| 3,834,422 | A | * | 9/1974 | Larson ......................... 138/97 |
| 3,902,528 | A | * | 9/1975 | Tartabini et al. .............. 138/90 |
| 3,946,761 | A | * | 3/1976 | Thompson et al. ........... 138/98 |
| 4,250,926 | A | | 2/1981 | Satterthwaite et al. |
| 4,413,655 | A | * | 11/1983 | Brown ......................... 138/97 |
| 4,591,477 | A | * | 5/1986 | Rettew ....................... 376/204 |
| 5,119,861 | A | | 6/1992 | Pino |
| 5,844,127 | A | * | 12/1998 | Berube et al. ............... 73/49.8 |
| 6,601,437 | B2 | * | 8/2003 | Gotowik ..................... 73/49.8 |

* cited by examiner

*Primary Examiner*—Patrick F. Brinson
(74) *Attorney, Agent, or Firm*—Whyte Hirschboeck Dudek SC

(57) ABSTRACT

An apparatus and method for isolating the end of a segment of pipe, which includes a substantially cylindrical body, having first and second ends, and a circumference slightly less than the inner diameter of the pipe segment; a pair of spaced apart inflatable seals positioned around the wall of the body; means for introducing a fluid into the inflatable seals through separate lines under sufficient pressure so that the inflatable seals are inflated against the wall of the pipe segment defining an annular space between the inflated inflatable seals; a line for introducing a fluid into the annular space under pressure to test the integrity of the seal between the inflatable seals and the pipe wall, and having a dual function to capture fluid which may have entered the annular space as a result of a inflatable seal failure; a line through the body for allowing fluid to flow through the line at predetermined times and pressures; and a plurality of bolts on the first end of the body which would engage the inner wall of the pipe in order to provide a secure engagement between the body and the pipe in the event of high unexpected pressure within the pipeline.

25 Claims, 8 Drawing Sheets

APPARATUS AND METHOD FOR ISOLATING AND TESTING A SEGMENT OF PIPELINES

CROSS REFERENCE TO RELATED APPLICATION

This application claims the benefit of U.S. application Ser. No. 60/621,264 filed on Oct. 21, 2004.

BACKGROUND OF THE INVENTION

The apparatus of the present invention relates to pipe plugs. More particularly, the present invention relates to an apparatus and method for isolating a segment of pipe in order to perform tasks in/or on the piping system or pipeline without being subjected to fluid pressure or hydrocarbons within the pipeline.

Industrial pipeline or piping systems require maintenance from time to time. Some maintenance procedures, such as replacing a section of pipeline or testing welds, require the isolation of a section of the pipeline from the fluids pumped through the pipeline. Such isolation is particularly important in the chemical industry because of the potential explosive or toxic nature of the fluid. In order to perform such maintenance tasks the two ends of the section of pipeline to be repaired must be sealed in order to maintain or block off fluid pressure in the line. Various known types of plugs, or the like, are placed in the pipeline and secured in place through various means.

One common such plug apparatus is disclosed in U.S. Pat. No. 5,844,127, which discloses an apparatus comprising an annular body with opposite annular faces and defining on its outer perimeter, an annular recess, a pair of bosses, a pair of resilient annular members adapted to be respectively juxtaposed between an adjacent boss and annular face; means for urging the bosses respectively against the adjacent resilient annular member so as to urge the same to frictionally engage and to seal against the internal wall of the selected pipe segment; and, means communicating through the apparatus to that plenum now defined by the recess, the resilient members and the internal wall of the pipe whereby the integrity of that pipe segment may be determined.

However, there is a need in the industry for a unitary body apparatus which would be used to isolate the end of the pipe through the use of fluid pressure, and would allow one to test the integrity of the seal between the sealing members on the apparatus so as to assure that no fluid in the pipeline, which oftentimes, is highly combustible gas, to escape into the other side of the plug in the work area.

There is also a need for the apparatus to be locked into the interior wall of the pipe to ensure that an unexpected pressure release in the pipeline will not force the apparatus out of the pipe.

BRIEF SUMMARY OF THE INVENTION

The present invention solved the problems in the art in a simple and straightforward manner.

In one embodiment, the invention is an apparatus for isolating the end of a pipe, comprising: a body portion, comprising an outer wall and first and second end portions, the body portion adapted for insertion into a pipe, wherein the pipe has an inner wall defining an inner pipe diameter; a pair of resilient sealing members in contact with and spaced apart around the outer wall of the body portion, the sealing members having an adjustable outer diameter; means for adjusting the outer diameter of the sealing members between a first diameter smaller than the inner pipe diameter and a second diameter at least equal to the inner pipe diameter, wherein when the outer diameter of the sealing members is adjusted to the second diameter the sealing members are in sealing engagement with the inner wall of the pipe and define an isolated space between the sealing members, the outer wall of the body portion, and the inner wall of the pipe; and a center wall located within the body portion at a position between the two sealing members.

Another embodiment of the invention is an apparatus for isolating the end of a pipe, comprising: a body portion, comprising an outer wall and first and second end portions, the body portion adapted for insertion into a pipe, wherein the pipe has an inner wall defining an inner pipe diameter; a pair of inflatable seals in contact with and spaced apart around the outer wall of the body portion; means for injecting a fluid into the inflatable seals to allow the inflatable seals to expand into sealing engagement with the wall of the pipeline and define an isolated space between the inflated inflatable seals, the inner wall of the pipe and the outer body wall; and a center wall located within the body portion at a position between the two inflatable seals.

A further embodiment of the invention is a method of isolating a segment of pipe, comprising the steps of: providing an apparatus having a diameter slightly smaller than the inner diameter of the pipe; introducing fluid into the apparatus to inflate a pair of spaced apart inflatable seals on the wall of the apparatus in sealing engagement with the inner wall of the pipe; inserting a fluid into an annular space defined by the two inflated inflatable seals to test the integrity of the seal between the inflatable seals and the wall of the pipeline; and providing a mechanical engagement between the pipeline wall and the apparatus to avoid inadvertent disengagement of the apparatus from the wall of the pipeline during work.

Still another embodiment of the invention is an apparatus for isolating the end of a pipe, comprising: a body portion, having a wall, a center plate, and first and second end portions, the body portion insertable in a pipe; a pair of spaced apart inflatable seals around the wall of the body portion; means for injecting a fluid into the inflatable seals to allow the inflatable seals to expand into sealing engagement with the wall of the pipeline and define an isolated space between the inflated inflatable seals; a flow line for injecting a fluid into the annular space between the inflated inflatable seals to test the integrity of the seal between the inflatable seals and the wall of the pipeline before commencing work on the pipe; and the flow line in subsection (d) allowing fluid which may flow into the annular space as a result of a failure in one of the inflatable seal seals to flow through the flowline and be captured and evacuated to a safe distance rather than make contact with the work area.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts or steps.

DETAILED DESCRIPTION OF THE INVENTION

Figure 1:
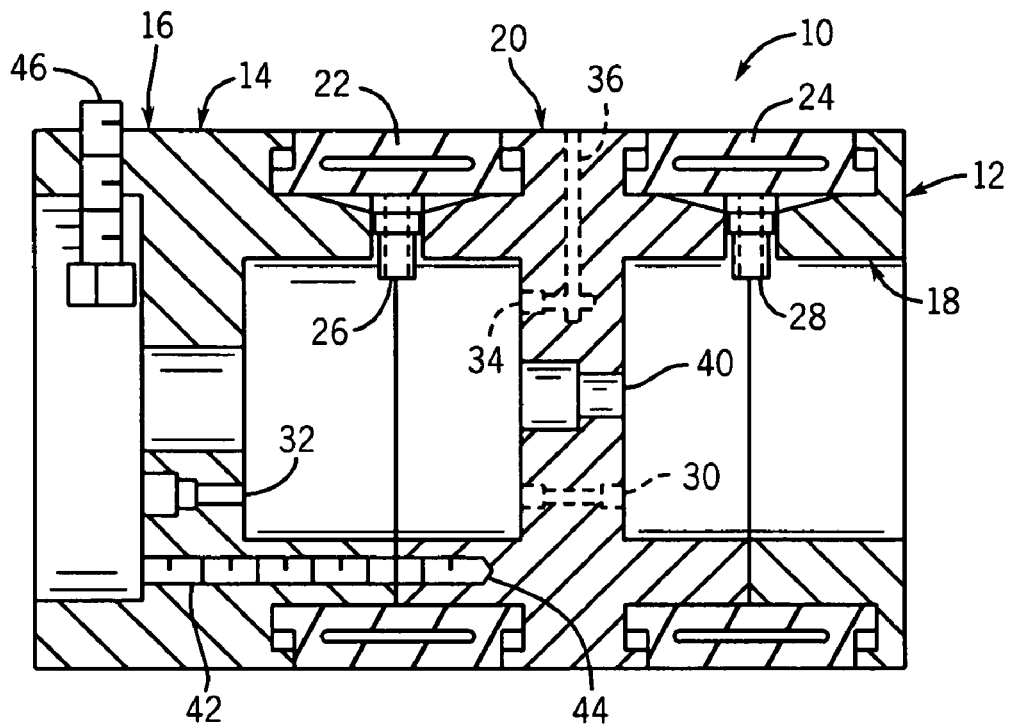
FIG. 1 illustrates a schematic side view of the apparatus.
Figure 2:
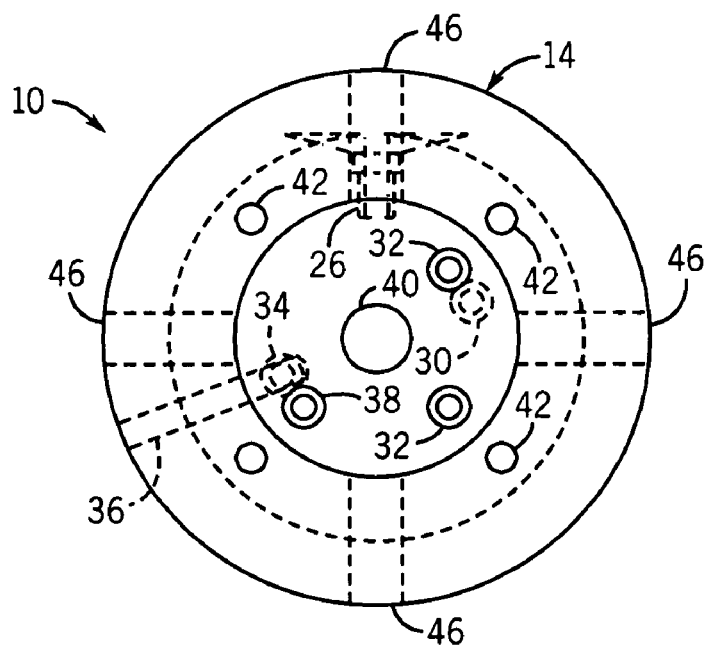
FIG. 2 illustrates an end view of the apparatus.

FIGS. 1 and 2, show an apparatus 10 comprises a unitary body 12, having a circular wall portion 20, and first end 16, a second end 18, which together define the cylindrical body 12. Body 12 has an external diameter slightly less than the interior diameter of the pipeline into which the apparatus 10 would be placed. The apparatus further comprises a pair of sealing members 22 and 24. Sealing members 22 and 24 comprise a flexible rubber-like or elastomeric material.

Sealing members 22, 24 may be of any type known in the art selected as desired and/or appropriate for the application. Three general types of sealing members are most often used for pipe plugs. One type of sealing member is an inflatable seal that facilitates insertion of the pipe plug into the pipe when deflated but engages the pipe wall when pressurized. The inflatable seal may also act to restrain movement of the pipe plug by frictional interaction with the pipe inner wall. An example of this type of sealing member is described in U.S. Pat. No. 4,250,926, which is incorporated herein by reference.

A second type of sealing member is an elastomeric seal that can be forced to expand radially to engage the pipe wall through compression caused by mechanical movement of the pipe plug ends towards each other. An example of this type of sealing member is described in U.S. Pat. No. 5,844,127, incorporated herein by reference.

The third type of sealing member is an elastomeric seal with an outer diameter sufficient to engage and seal against the inner pipe wall. The elastomeric seal may be radially contracted by mechanically moving the ends of the plug away form each other so as to permit placement of the plug within the pipe. An example of this type of sealing member is described in U.S. Pat. No. 5,119,861, incorporated herein by reference.

Although the sealing means of the inventive pipe plug may be any of the types of sealing members described above, for clarity of illustration, only the first type, inflatable seals, will be described in detail herein. As such, sealing members 22 and 24 will also be called inflatable seals 22 and 24, respectively.

Inflatable seals 22 and 24, as seen in FIG. 1, are in the deflated configuration. Inflatable seals 22, 24 are expandable under internal fluid pressure, and will be discussed more fully herein. Inflatable seals 22, 24 are connected to inflation seal ports 26 and 28, respectively. Inflation seal 28 is connected to the front end of center section through channel 30 via a pipe or tube (not shown). Inflation seal port 26 and the rear end of center section through channel 30 are each connected to separate connection ports 32 via a pipe or tube (not shown). Connection ports 30, 32 are in fluid communication with a source of pressurized fluid that can be used to inflate the inflatable seals 22 and 24.

Annulus connection channel 36 is in fluid communication with annulus connection port 34. Annulus connection port 34 is connected to connection port 38 via a pipe of tube (not shown). Connection port 38 is in fluid communication with a source of pressurized fluid, which may or may not be the same pressurized fluid used to inflate the inflatable seals.

A port 40 passes through center section 20. A by-pass line (68 shown in FIG. 10) connects to port 40 and extends through the entire length of the apparatus 10 to allow fluid to flow therethrough while the apparatus is secured in place in the pipeline.

First end section 16 and circular wall portion 20 are attached to each other by bolts (not shown) engaging aligned bolt holes 42 and 44 respectively. Similar bolt holes for attaching the second end section 18 to circular wall portion 20 are shown in FIGS. 5–8.

FIGS. 1–4 also illustrate a plurality of threaded setscrew restraint lugs 46. The number of restraint lugs will be based upon the size and pressure rating of the tool but would typically be four in number. As further illustrated in FIG. 10, when the apparatus has been engaged within a pipeline 64 (FIG. 10), the lugs 46 are rotated until the ends of each lug 46 is tightly engaged onto the inner surface of the pipeline 64. Therefore, in the event a "kick" in pipeline pressure is experienced within the pipeline 64, the lugs 46 will serve as an additional means to maintain the apparatus 10 in place within the pipeline 64. These lugs reduce the possibility of pipeline pressure dislodging the apparatus 10 from the pipeline and propelling apparatus 10 like a dangerous projectile into the work area.

Figure 3:
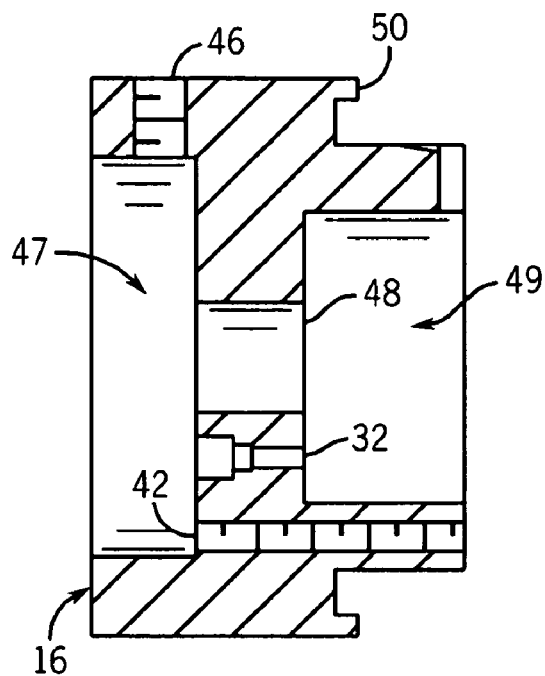
FIG. 3 illustrates a cross-sectional side view of the rear end of the apparatus.
Figure 4:
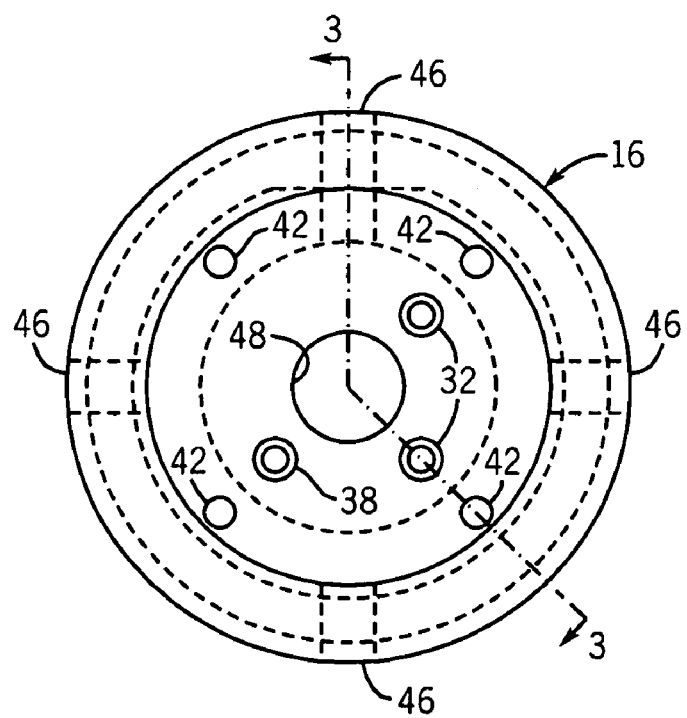
FIG. 4 illustrates an end view of the rear end of the apparatus.

FIGS. 3–4 illustrate the first end section 16 of the apparatus 10, which includes an opening 48 through which bypass line 68 (FIG. 10) would extend. The area 47 would include external piping (not shown) connecting connection ports 32 and 38 with sources of pressurized fluid. The area 49 would include internal piping (not shown) connecting connection ports 32 and 38 with the inflatable seals and the annular connection port 34, respectively. Lip 50 engages with a shoulder on the inflatable seal to prevent movement of the inflatable seal.

Figure 5:
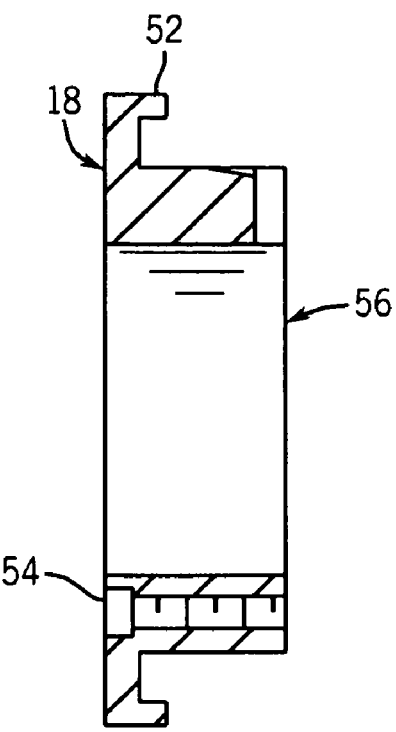
FIG. 5 illustrates a cross-sectional side view of the front end of the apparatus.
Figure 6:
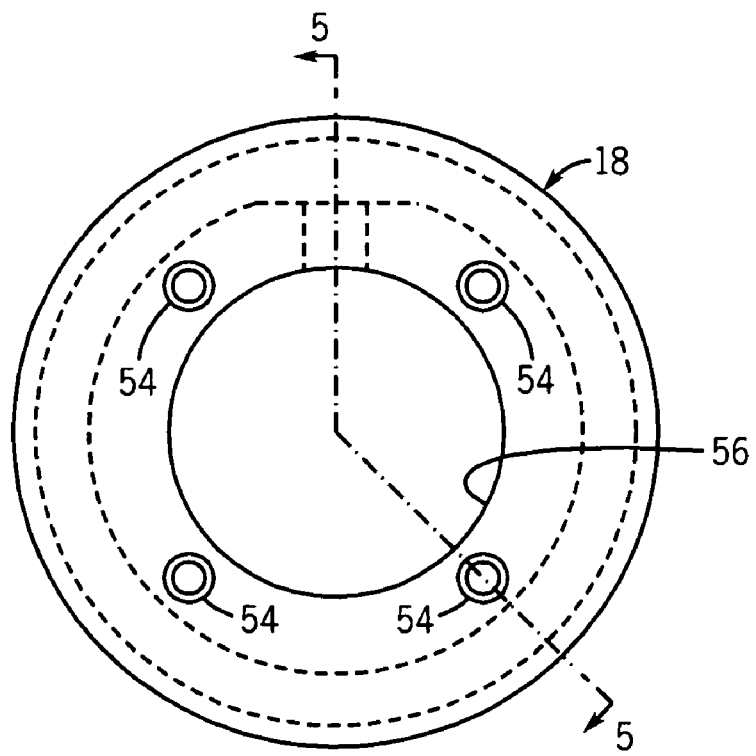
FIG. 6 illustrates an end view of the front end of the apparatus.
Figure 7:
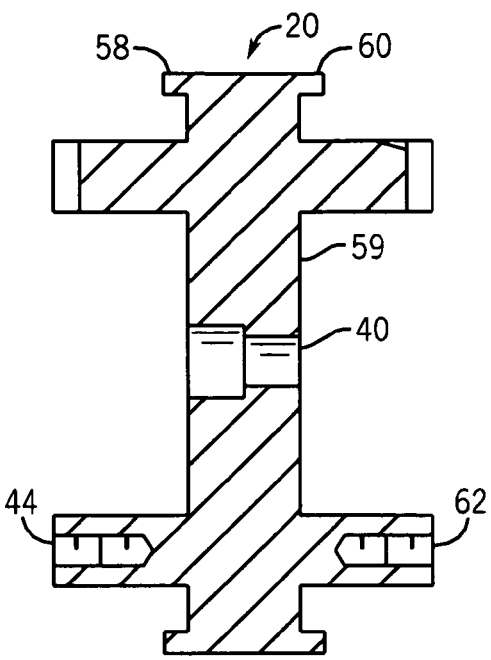
FIG. 7 illustrates a cross-sectional side view of the center section of the apparatus.
Figure 8:
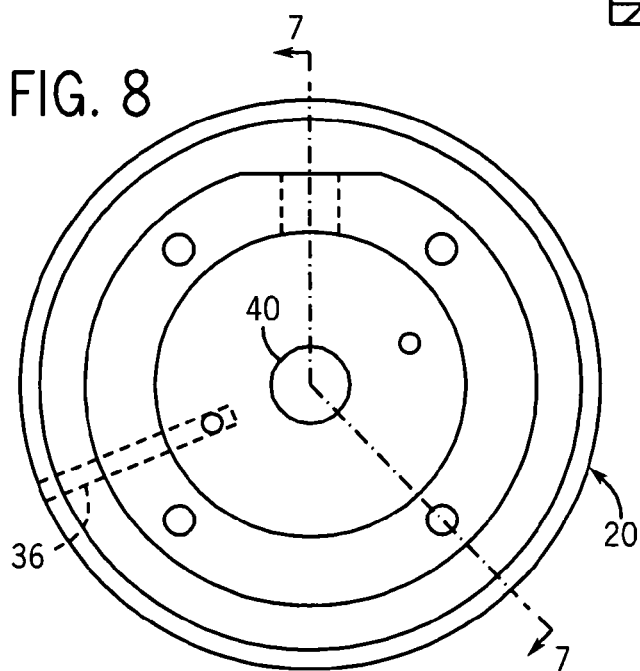
FIG. 8 illustrates an end view of the center section of the apparatus.
Figure 9:
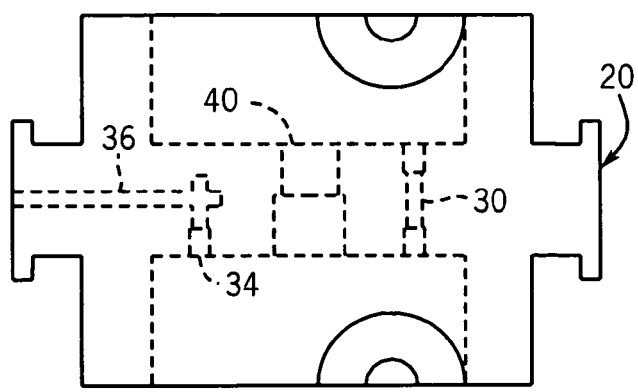
FIG. 9 is a schematic side view of the center section of the apparatus.
Figure 10:
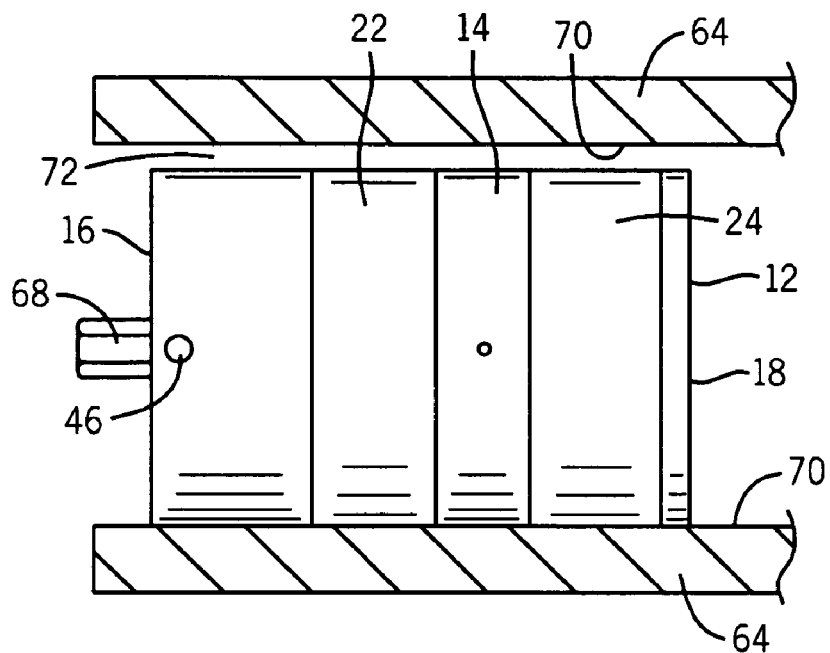
FIG. 10 is a schematic side view of the apparatus, with the seals deflated or retracted, positioned in a pipeline.

FIGS. 5–6 illustrate the second end section 18 of the apparatus 10, which includes an opening 56 that provides access to bypass line 68 (FIG. 10). Lip 52 engages with a shoulder on the inflatable seal to prevent movement of the inflatable seal. Bolt holes 54 align with corresponding bolt holes in the center section to allow the two sections to be secured together. Lip 58 engages with a shoulder on the inflatable seal to prevent movement of the inflatable seal. Lip 58 is aligned opposite of lip 50 of the rear section 16 and inflatable seal 22 is disposed between lips 50 and 58. Similarly, lip 60 engages with the shoulder on an inflatable seal 24 and is aligned opposite lip 52 front on section 18 in order to maintain the position of inflatable seal 24. As explained earlier, bypass port 40 provide a flow path to, and a connection for, bypass pipe 68 (not shown in this view). Also as explained earlier, bolt holes 44 align with bolt holes 42 of the rear end section to provide for attaching the center section to the rear section. Likewise, bolt holes 62 align with bolt holes 54 of the front end section 18 to provide for securing the front end section 18 to center section 20.

Figure 11:
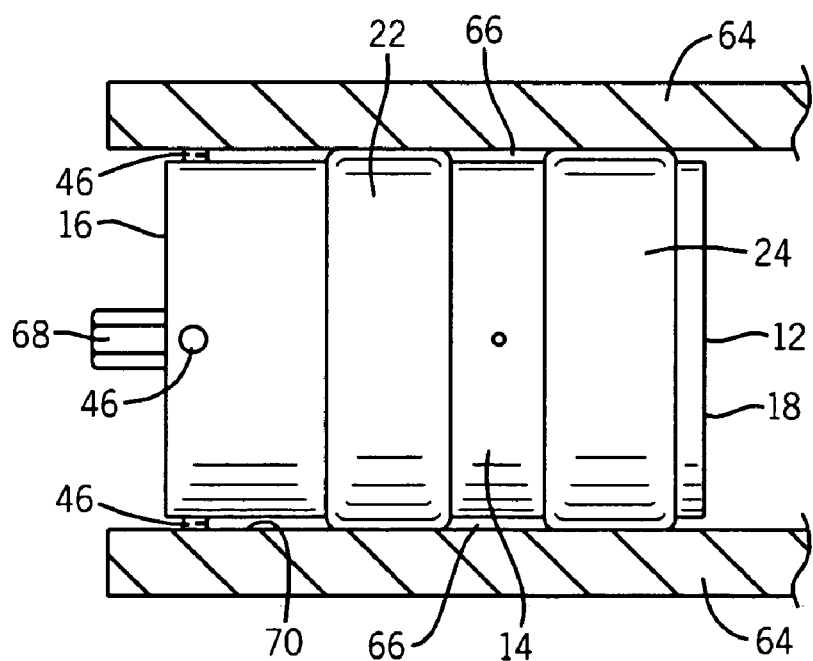
FIG. 11 is the same view as FIG. 10 but with the seals inflated or extended.

FIGS. 10 and 11 show apparatus 10 within a pipeline 64. As seen first in FIG. 10, the apparatus 10 has been inserted within an end of the pipeline 64 and is resting on the inner wall 70 of the pipeline 64. The difference in the outer diameter of apparatus 10 and the diameter of the inner wall 70 defines a space 72 between the wall 12 of the apparatus 10 and the inner surface 70 of the pipeline. As discussed earlier, the inflatable seals 22, 24 are initially deflated, and in that state, are substantially the same diameter as the wall 14 of the apparatus 10. Locking lugs 46 are shown in a retracted positioning in FIG. 10 and in an extended position engaged with inner wall 70 of pipeline 64 to maintain the position of apparatus 10. The locking lugs 46 will have a calculated load value based upon the size of the lug and the amount of lugs on the apparatus.

In FIG. 11, the inflatable seals are shown in the inflated position wherein the seals are in contact with the inner wall 70 of the pipeline 64. The inflation of the seals to contact the pipe wall more or less centers apparatus 10 within pipeline 64. An annular space 66 is defined between inflated seals 22 and 24 and body wall 14 and pipe inner wall 70.

Figure 12:
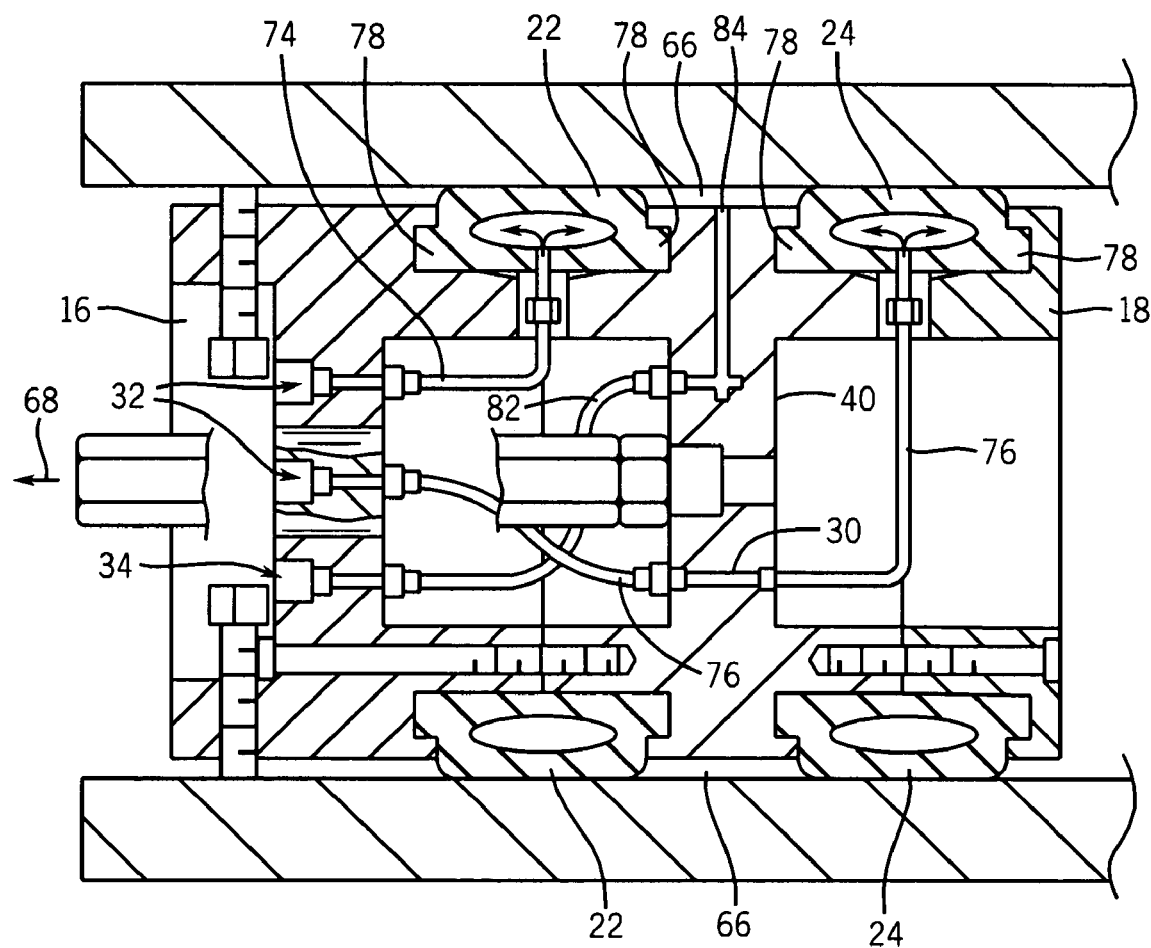
FIG. 12 is a schematic side view of the internal piping of the apparatus.

FIG. 12 illustrates the process and internal piping to allow the inflatable seals 22, 24 to be inflated, and to allow the introduction and evacuation of fluid into the annular space 66 when the integrity of the seal between the inflatable seals 22, 24 and the pipe wall 70 is being determined. There is provided a means for allowing fluid, such as water, gas, or other test fluid to be inserted into each of the inflatable seals 22, 24. A pair of ports 32 allow fluid to flow through fluid lines 74, 76 into each of the inflatable seals 22, 24 respectively, in order to introduce sufficient fluid under pressure to inflate the inflatable seals 22, 24 into sealing engagement against the wall 70 of the pipeline 64. As seen, the fluid line 76 has to extend through the center section 20 of the apparatus 10 via through channel 30 before connecting with the inflatable seal 24.

The inflatable seals 22, 24 include a lower pair of shoulder members 78, which engage with lips 50, 52 and 58 (as previously discussed), to prevent the inflatable seals from disengaging from the wall of the apparatus 10 when the inflatable seals are inflated. Bypass line 68 extends from threaded port 40 in center section 20 to allow bypass flow during use. Line 68 exits the body, and includes the threaded fixture which may threadedly engage to a second line for continuing the fluid flow out of the line 68. Center plate 59 of center section 20 serves as a block between the seals so that pipeline pressure or fluids cannot migrate from the end of the tube between the seals without being detected.

Figure 13:
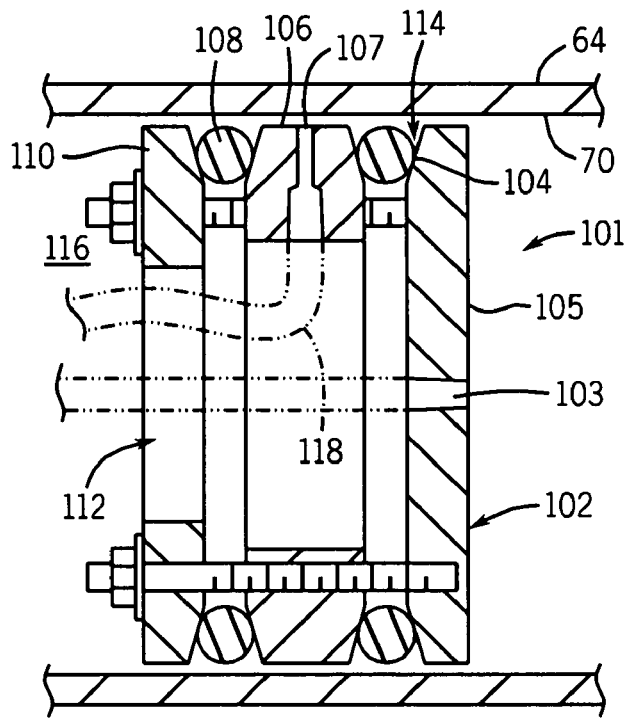
FIG. 13 is a side schematic view of a prior art pipeline plug having an end plate.
Figure 15:
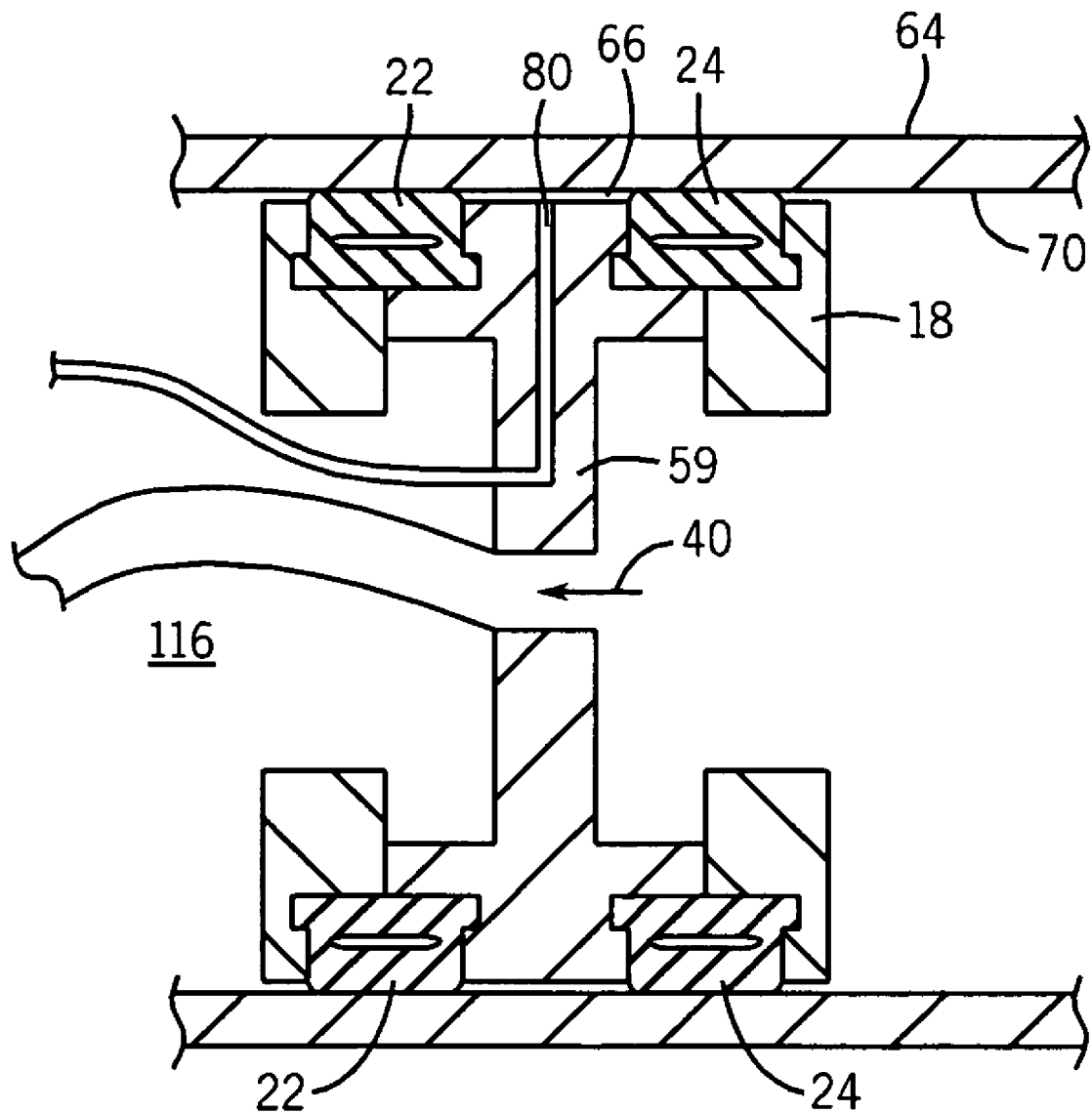
FIG. 15 is a schematic side view of the apparatus in a pipe.

Center plate 59, as illustrated in FIGS. 12 and 15, offers a big advantage over common prior art tools as illustrated in FIG. 13. As shown in FIG. 13, the isolation tool 101 having a first end plate 102, a first sealing ring 104, a central tool body 106, a second sealing ring 108 and a rear ring 110 having a large opening 112. As illustrated, front plate 102 has a flow line 103 where a hydrocarbon may flow through the tool, while in use. Likewise, the central body portion 106 has a bleed line 107, which is designed to allow any leak which would occur to be bled through the line 107. However, as seen in the prior art tool 101, should there be a leak between the first end plate 102 and the first sealing ring 104 at point 114, pipeline fluids, such as hydrocarbons, may enter through that space at point 114, and enter into the work area 116 which is outside of the flow line 118 which is used to contain the hydrocarbons, thus contaminating the work area 116 and perhaps harming workers in the area 116.

As seen in FIG. 15, of the present invention, which is a schematic cross-sectional view of the present invention, more thoroughly discussed in FIG. 12, should a leak occur between inflatable seal 24 and the wall 70 of the pipeline 64, the hydrocarbon leak would be unable to pass from the break at point 19, because of the center wall 59. The leak would be contained in annular space 66, because of second inflatable seal 22, and could go no further, but would have to flow into the bleed line 80 and be bled off. Therefore, there is no chance in this configuration that there may be contamination of the work area 116 as with the prior art tool. It is clearly seen that the sealing members 22, 24 of the present invention are housed within the body 12 of the tool, and therefore the only opportunity for fluid to leak past a break in the seal would be through the gap between the wall of the pipeline and the failed sealing member, which would again allow the leak only to flow into the bleed line 80.

As was stated earlier, there is provided a means to allow the annular space 66 between the inflated inflatable seals 22, 24 to be tested, in order to test the integrity of the seal between the inflatable seals 22, 24 and the pipeline wall 70. In FIG. 12, a third port 34 at the rear end 16 of apparatus 10 which allows fluid to flow through a line 82 to exit a port 84 in the wall of the apparatus 10 within the annular space 66. Therefore, a test fluid could flow under pressure through line 82 and fill annular space 66 under a given pressure. If, after a predetermined time, no fluid leak is detected between the inflatable seals 22, 24 and the pipeline wall 70, the fluid is allowed to flow out of the annular space 66, via port 84, into this single line 82, and the apparatus is in secure and safe mode for the work to begin. However, another very important function of port 84 is provided. If, during the work, a leak would occur in the rear inflatable seal 24, and fluid, such as natural gas or the like, would flow into annular space 42, the fluid, being blocked by the front inflatable seal 22, would seek the path of least resistance, and would flow into port 84 through line 82 and out of port 34, connected to a line to capture the leak. This would allow the work to continue, and the failure in the inflatable seal 24 to be repaired or the inflatable seal 24 replaced.

In an alternative embodiment, the test fluid could be maintained in annular space 66 under pressure to allow for continuous leak testing.

It is through this novel construction of the apparatus 10, which allows the apparatus to securely house the inflatable seals 22, 24, so that they may be secured against the wall 70 of pipeline 64 so as to provide a fluid tight seal. Further, there is provided a means to allow the integrity of the seal to be tested, and an additional means for providing that the apparatus be firmly secured to the wall of the pipeline 64, in addition to the inflatable seals 22, 24 sealing against the pipeline wall 70. Through a unitary body, having no moving parts, and a single test line, this embodiment of the invention provides an efficient and safe method of isolating the pipeline from the work place.

Figure 14:
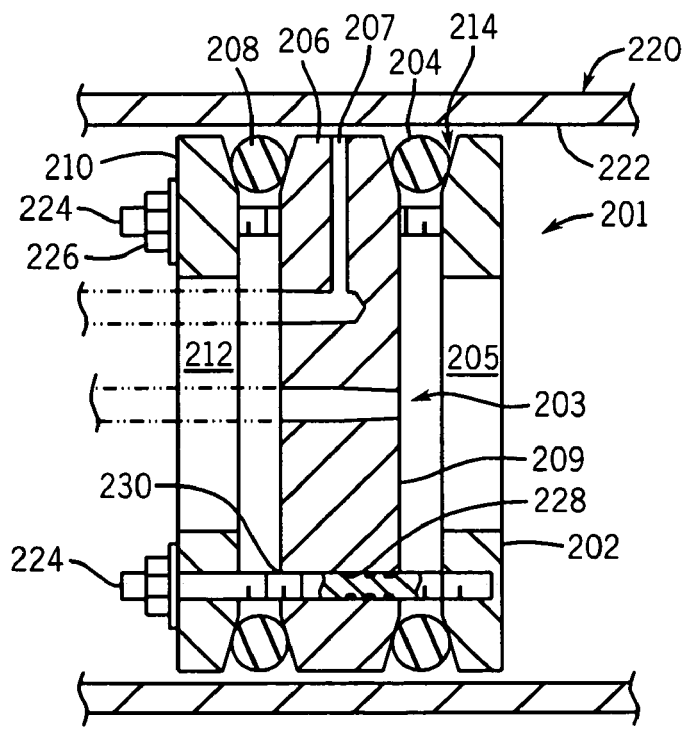
FIG. 14 is a side schematic view of an alternate embodiment of the invention wherein the plug of FIG. 12 has been modified to incorporate the center plate of the current invention.

FIG. 14 shows a schematic view of embodiments of the invention wherein the sealing members are of the second or third type described above. A pipe plug 201 is inserted into a pipe 220. The pipe plug 201 has a first end plate 202 that has a large opening 205, a first sealing member 204, a central tool body 206 having a center plate 209, a second sealing member 208 and a rear ring 210 having a large opening 212.

As shown, sealing members 204 and 208 are in sealing engagement with inner pipe wall 222. One skilled in the art will realize that, for plugs comprising sealing members of the second type, the sealing engagement is provided by radial expansion of sealing members 204 and 208 due to compression resulting from mechanical movement of end plates 202 and 210 towards each other. Likewise, for sealing members of the third type, sealing members 204 and 208 are in their standard, relaxed condition and insertion was conducted with the sealing members 204, 208 radially contracted through mechanical movement of end plates 202 and 210 away from each other (not shown).

As illustrated, center plate 209 has a flow line 203 where a pipeline fluid, e.g., a hydrocarbon, may flow through the tool, while in use. Likewise, the central body portion 206 has a bleed line 207, which is designed to allow any leak between sealing member 204 and inner pipe wall 222 to be bled through the line 207. In contrast to the prior art tool 101 (shown in FIG. 7A), a leak between the first end plate 202 and the first sealing member 204 at point 214 is irrelevant because pipeline fluids, such as hydrocarbons, are still prevented from entering into the work area 216 which is outside of the flow line 203 which is used to contain the pipeline fluids.

Threaded rods 224 extend through end plate 210 and center tool body 206 to engage end plate 202. Rotation of rod 224 in relation to nut 226 causes plates 210 and 202 to move in relation to each other. Sealing gaskets 228, such as O-rings, are provided to prevent fluid leakage through plate 209 along the bore 230 through which rod 224 passes.

The method which is carried out through use of the apparatus is simple and straightforward. The apparatus 10 as disclosed herein would be slid into the end of a pipeline, with the inflatable seals 22 and 24 deflated. A fluid line may be secured to the first end 16 of the apparatus 10. A hose or line would be attached to end 26 to evacuate hydrocarbons or pressure away from the work area. Next, fluid would be introduced under pressure into either or both ports 32, which would transport fluid into lines 74, 76 to inflate each inflatable seal 22, 24, sufficiently to form a fluid tight seal completely around the engagement of the inflatable seals 22, 24 against the pipeline wall 70, at the same time defining an isolated annular space 66 between the inflatable seals. Next, the locking lugs 46 would be engaged around the wall of the apparatus 10 to the wall 70 of the pipeline 64 to serve as a further means to secure the apparatus in place in the pipeline 64. Before work begins, a second fluid, such as water or the like, would be injected into the test port 84, so that fluid would travel into the annular space 66, to ascertain whether any fluid flows out of the space 66, which would mean that the seal is not fluid tight. If the seal tests positive, the fluid is then drained from the annular space 66, and the work on the working end of the apparatus could begin without fear of a leak of hazardous or combustible fluid entering the work area from the pipeline.

Alternatively, the test fluid could be held at a pressure in space 66 and the pressure could be monitored as described in U.S. Pat. No. 5,844,127, incorporated herein by reference. As stated earlier, if a leak would occur in the rear seal (between inflatable seal 24 and wall 70, the fluid, instead of continuing through the annular space 66 would be directed into the line 80, and exit through port 36, which would be secured to a line so that the leak would be maintained isolated until the failed seal could be detected and repaired.

The foregoing embodiments are presented by way of example only; the scope of the present invention is to be limited only by the following claims.

What is claimed is:

1. An apparatus for isolating the end of a pipe, comprising:
    a body portion, comprising an outer wall and first and second end portions, the body portion adapted for insertion into a pipe, wherein the pipe has an inner wall defining an inner pipe diameter;
    a pair of resilient sealing members in contact with and spaced apart around the outer wall of the body portion, the sealing members having an adjustable outer diameter;
    means for adjusting the outer diameter of the sealing members between a first diameter smaller than the inner pipe diameter and a second diameter at least equal to the inner pipe diameter, wherein when the outer diameter of the sealing members is adjusted to the second diameter the sealing members are in sealing engagement with the inner wall of the pipe and define an isolated space between the sealing members, the outer wall of the body portion, and the inner wall of the pipe; and,
    a center wall located within the body portion at a position between the two sealing members such that, if a fluid within the pipe leaks between the inner wall of the pipe and a sealing member, the center wall and the other sealing member provide a barrier to prevent such fluid from passing downstream of the apparatus.

2. The apparatus of claim 1, further comprising means for testing for leaks in the sealing engagement between the sealing members and the inner wall of the pipe.

3. The apparatus of claim 2, wherein the means for testing for leaks comprises means for injecting a fluid into the isolated space.

4. The apparatus of claim 3, wherein the means for injecting fluid into the isolated space comprises a line for carrying fluid into the annular space and for evacuating the fluid from the annular space.

5. The apparatus of claim 1, further comprising a fluid flow line through the apparatus for allowing fluid to flow from the first end of the apparatus through to the second end of the apparatus.

6. The apparatus of claim 5, wherein the fluid flow line through the apparatus passes through the center wall.

7. The apparatus of claim 1, further comprising a plurality of bolts for engaging against the inner wall of the pipe to secure the apparatus within the pipe.

8. The apparatus of claim 1, wherein the means for adjusting the outer diameter of the sealing members comprise the first and second ends, wherein the first and second ends are moveable in relation to the body potion.

9. The apparatus of claim 8, wherein the first and second ends are moved towards the body portion such that the sealing members are compressed to provide a larger outer diameter of the sealing members.

10. The apparatus of claim 8, wherein the first and second ends are moved away from the body portion to stretch the sealing members to provide a smaller outer diameter of the sealing members.

11. An apparatus for isolating the end of a pipe, comprising:
    a body portion, comprising an outer wall and first and second end portions, the body portion adapted for insertion into a pipe, wherein the pipe has an inner wall defining an inner pipe diameter;

a pair of inflatable seals in contact with and spaced apart around the outer wall of the body portion;

means for injecting a fluid into the inflatable seals to allow the inflatable seals to expand into sealing engagement with the wall of the pipeline and define an isolated space between the inflated inflatable seals, the inner wall of the pipe and the outer body wall; and a center wall located within the body portion at a position between the two inflatable seals such that, if a fluid within the pipe leaks between the inner wall of the pipe and an inflatable seal, the center wall and the other inflatable seal provide a barrier to prevent such fluid from passing downstream of the apparatus.

12. The apparatus of claim 11, further comprising means for testing for leaks in the sealing engagement between the sealing members the inner wall of the pipe.

13. The apparatus of claim 12, wherein the means for testing for leaks comprises means for injecting a fluid into the isolated space.

14. The apparatus of claim 13, wherein the means for injecting fluid into the isolated space comprises a line for carrying fluid into the annular space and for evacuating the fluid from the annular space.

15. The apparatus of claim 11, further comprising a fluid flow line through the apparatus for allowing fluid to flow from one end of the apparatus through to the second end of the apparatus.

16. The apparatus of claim 15, wherein the fluid flow line through the apparatus passes through the center plate.

17. The apparatus of claim 11, further comprising means for engaging the apparatus against the inner wall of the pipe securely to avoid the apparatus from becoming dislodged from the wall of the pipeline.

18. The apparatus in claim 17, wherein the means for engaging the apparatus against the inner wall of the pipe comprises a plurality of bolts in the body portion for engaging against the inner wall of the pipe.

19. The apparatus of claim 11, further comprising a first line for injecting fluid into the first inflatable seal and a second line for injecting fluid into the second inflatable seal.

20. The apparatus of claim 11, wherein the means for injecting fluid into the inflatable seals comprises a port for receiving fluid into a fluid line to each of the inflatable seals.

21. A method of isolating a segment of pipe, comprising the steps of:

providing an apparatus having a diameter slightly smaller than the inner diameter of the pipe;

introducing fluid into the apparatus to inflate a pair of spaced apart inflatable seals on the wall of the apparatus in sealing engagement with the inner wall of the pipe;

inserting a fluid into an annular space defined by the two inflated inflatable seals to test the integrity of the seal between the inflatable seals and the wall of the pipeline; and providing a mechanical engagement between the pipeline wall and the apparatus to avoid inadvertent disengagement of the apparatus from the wall of the pipeline during works, wherein the apparatus comprises a center wall located between the inflatable seals such that, if a fluid within the pipe leaks between the inner wall of the pipe and an inflatable seal, the center wall and the other inflatable seal provide a barrier to prevent such fluid from passing downstream of the apparatus.

22. The method in claim 21, further comprising the step of bleeding off any fluid which may enter the annular space due to a seal failure without the fluid contacting the work area.

23. An apparatus for isolating the end of a pipe, comprising:

a body portion, having an outer wall, first and second end portions, and a center plate located within the outer wall of the body between the first and second end portions of the body, wherein the body portion is insertable in a pipe;

a pair of spaced apart inflatable seals around the outer wall of the body portion;

means for injecting a fluid into the inflatable seals to allow the inflatable seals to expand into sealing engagement with the wall of the pipeline and define an isolated space between the inflated inflatable seals;

a flow line for injecting a fluid into the annular space between the inflated inflatable seals to test the integrity of the seal between the inflatable seals and the wall of the pipeline before commencing work on the pipe; and the flow line allowing fluid which may flow into the annular space as a result of a failure in one of the inflatable seal seals to flow through the flowline and be captured and evacuated to a safe distance rather than make contact with the work area.

24. The apparatus in claim 23, further comprising a plurality of locking lugs on the wall of the apparatus for securing the body portion against the wall of the pipeline so as to avoid any movement of the body portion during work on the pipeline.

25. The apparatus in claim 23, wherein the first and second inflatable seals are inflated and deflated through a separate line to each of the inflatable seals.

* * * * *